United States Patent [19]

Kobayashi

[11] Patent Number: 5,022,504
[45] Date of Patent: Jun. 11, 1991

[54] COLUMN SHIFT WITH SAFETY DEVICE

[75] Inventor: Satoshi Kobayashi, Hiratsuka, Japan

[73] Assignee: Nissan Motor Co., Ltd., No. 2, Yokohama, Japan

[21] Appl. No.: 538,449

[22] Filed: Jun. 15, 1990

[30] Foreign Application Priority Data

Jul. 25, 1989 [JP] Japan .................. 1-193678

[51] Int. Cl.$^5$ ............................. B60K 41/24
[52] U.S. Cl. ................. 192/4 A; 74/483 R; 74/473 SW
[58] Field of Search ............... 192/4 A; 74/473 SW, 74/483 R

[56] References Cited

U.S. PATENT DOCUMENTS

| | | | |
|---|---|---|---|
| 2,968,378 | 1/1961 | Yanda | 192/4 A |
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,572,340 | 2/1986 | Pierce | 192/4 A X |
| 4,905,802 | 3/1990 | Gotoh | 192/4 A |
| 4,934,496 | 6/1990 | Barske et al. | 74/483 X |
| 4,936,431 | 6/1990 | Shinpo | 192/4 A |
| 4,938,042 | 7/1990 | Muramatsu | 192/4 A X |

FOREIGN PATENT DOCUMENTS

| | | | |
|---|---|---|---|
| 151025 | 8/1985 | European Pat. Off. | 192/4 A |
| 63-15228 | 1/1988 | Japan . | |

*Primary Examiner*—Allan D. Hermann
*Assistant Examiner*—Nicholas Whitelaw
*Attorney, Agent, or Firm*—Pennie & Edmonds

[57] ABSTRACT

In order to assure the safety of starting of an automatic transmission type motor vehicle, a safety device is equipped to a column shift. Due to locking function provided by the safety device, the shifting movement of a shift lever from Parking-position to the other positions is permitted only when the foot brake is kept depressed.

6 Claims, 2 Drawing Sheets

COLUMN SHIFT WITH SAFETY DEVICE

BACKGROUND OF THE INVENTION

1. Field of the Invention

The present invention relates in general to shift devices for automotive transmissions, and more particularly to column shifts of a type which controls an automatic transmission mounted in a motor vehicle.

2. Description of the Prior Art

For safety of starting, some of motor vehicles of automatic transmission type have a safety device which permits the shifting movement of a shift lever from Parking-position to other positions only when the foot brake is kept depressed. However, hitherto, in the field of the column shifts, the safety device has been given little thought.

SUMMARY OF THE INVENTION

It is therefore an object of the present invention to provide a column shift which is equipped with a safety device which permits the shifting movement of a shift lever from Parking-position to other positions only when the foot brake is kept depressed.

According to the present invention, there is provided a column shift for use with a motor vehicle having an automatic transmission. The column shift comprises an elongate hollow member supported by a fixed member of the motor vehicle, the hollow member being rotatable about a longitudinal axis thereof; link means for linking the hollow member to a hydraulically operated controller of the transmission; a control rod axially movably received in the elongate hollow member; a shift lever having one end articulated with one end of the control rod, the shift lever being pivotally connected to the elongate hollow member; a position lever pivotally connected to the other end of the control rod, the position lever having one end pivotally connected to the hollow member; a position plate secured to a fixed member of the motor vehicle and having a stepped edge to which a free end portion of the position lever being engageable; a lock lever movable between a first position wherein the lock lever locks the position lever when the latter assumes a given position of the stepped edge and a second position wherein the lock lever unlocks the position lever; and an electric second positions.

BRIEF DESCRIPTION OF THE DRAWINGS

Other objects and advantages of the present invention will become apparent from the following decription when taken in conjunction with the accompanying drawings, in which.

DETAILED DESCRIPTION OF THE INVENTION

Figure 1:
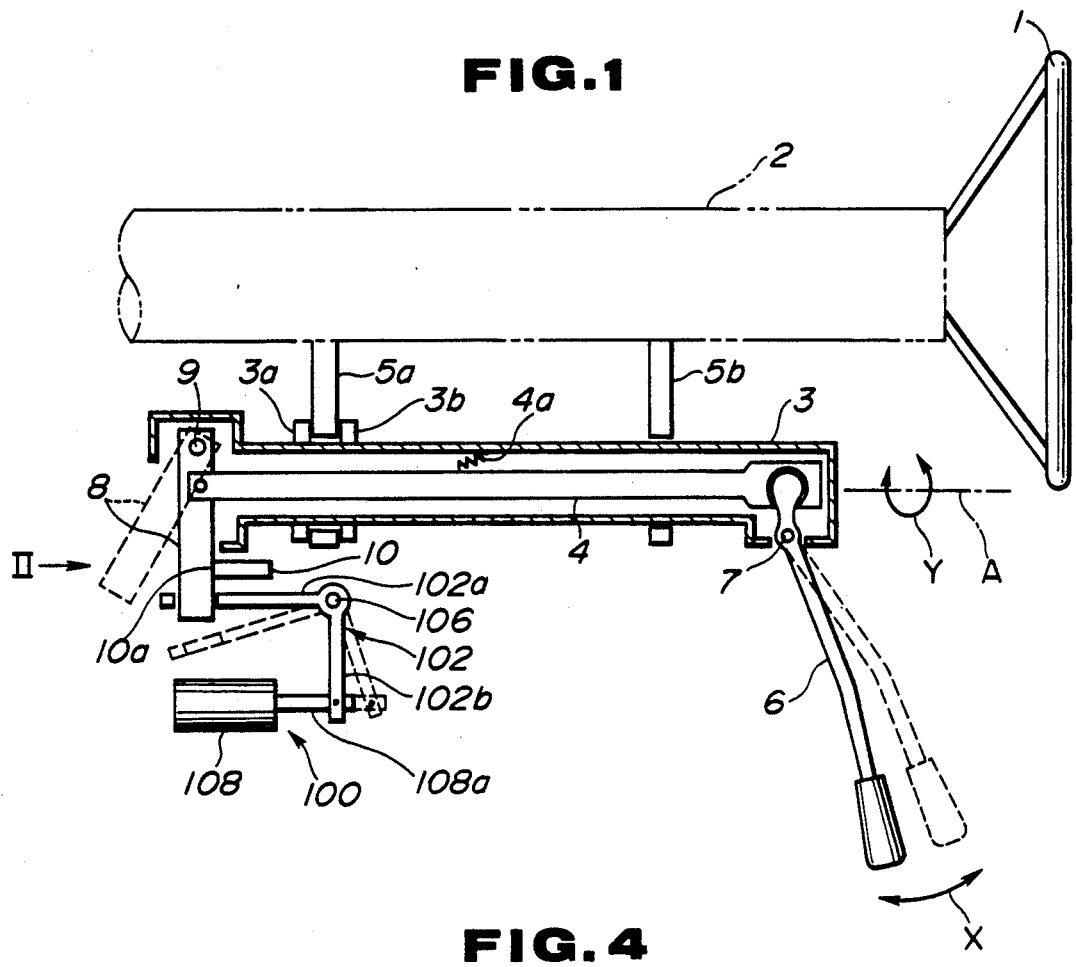
FIG. 1 is a schematic view of a column shift according to the present invention, the column shift being equipped with a safety device.

Referring to FIGS. 1 to 4, particularly FIG. 1, there is shown a column shift according to the present invention. In the drawing, denoted by numeral 1 is a steering wheel. The rotational movement of the steering wheel 1 is transmitted to front steered wheels (not shown) of an associated motor vehicle through a steering column received in a steering column housing 2.

As is seen from FIG. 1, the column shift of the invention is arranged beside the steering column housing 2. The column shift comprises an elongate housing which is rotatably held by brackets 5a and 5b secured to the steering column housing 2. That is, the elongate hollow member 3 is rotatable about its longitudinal axis "A" relative to the fixed brackets 5a and 5b. A stopper including spaced lugs 3a and 3b secured to the bracket 5a is arranged to suppress an axial movement of the hollow member 3.

Although not shown in the drawing, a known linkage extends from the hollow member 3 to a known hydraulically operated controller for the automatic transmission, so that the rotational movement of the hollow member 3 changes the gear position which the transmission assumes.

Within the elongate hollow member 3, there is disposed a control rod 4 which is axially movable relative to the hollow member 3. A biasing means 4a is arranged to bias the control rod 4 rightward in the drawing. The control rod 4 has a rear end articulated with an inner end of a shift lever 6 which extends away from the hollow member 3.

The shift lever 6 is pivotally connected, at a portion near the articulated end, to the elongate hollow member 3 by means of a povit pin 7.

The control rod 4 has a front end pivotally connected to a position lever 8 which has one end pivotally connected to the hollow member 3 through a pivot pin 9. Denoted by numeral 10 is a position plate which is fixed to a suitable fixed member. The position plate 10 has a stepped edge 10a including a plurality of steps (see FIG. 3) to which the position lever 8 is contactable.

Due to the force of the biasing means 4a, the position lever 8 is forced to abut against one of the steps of the stepped edge 10a keeping the selected gear position which the transmission has assumed.

Figure 2:
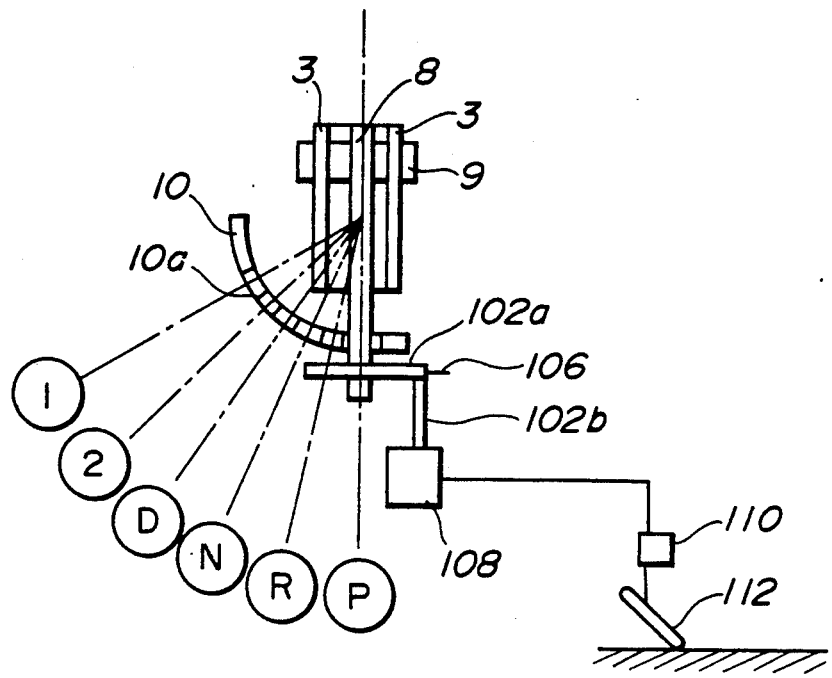
FIG. 2 is a view taken from the direction of the arrow "II—II" of FIG. 1, showing the portion where the safety located.
Figure 3:
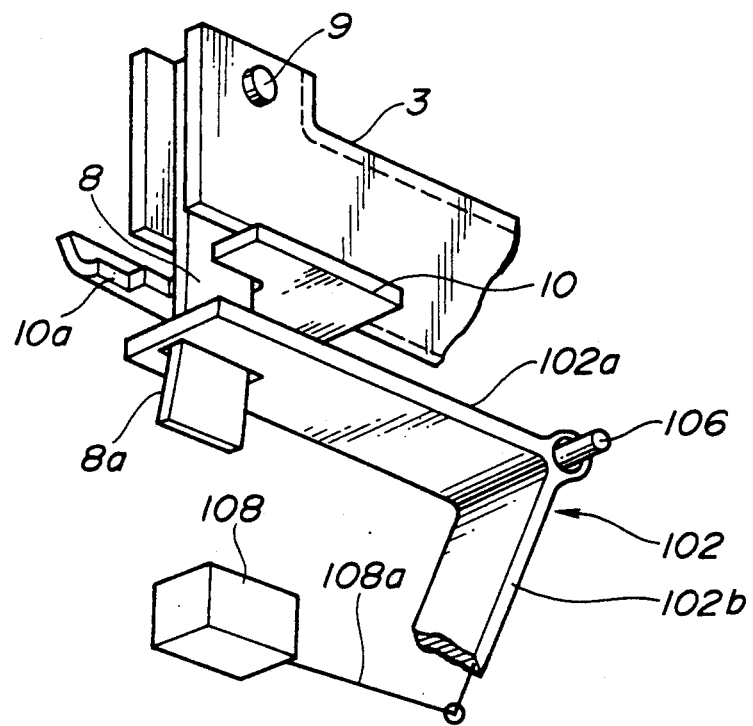
FIG. 3 is a perspective view of the portion where the safety is located.

FIG. 2 shows the relationship between the steps of the position plate 10 and the gear positions "1", "2", "D", "N", "R" and "P" which the transmission assumes when the position lever 8 abuts against the corresponding steps.

As is seen from FIG. 1, when the shift lever 6 is forced in the direction of the arrow "X", that is, toward a driver sitting on a driver's seat (not shown), the same is pivoted about the pivot pin 7 moving the control rod 4 forward in the hollow member 4 against the force of the biasing means 4a and thus the position lever 8 is pivoted counterclockwise disengaging from the stepped edge of the position plate 10. When, with the shift lever 6 kept pulled, the same is forced in the direction of the arrow "T", the hollow member 3 is rotated about the axis "A" changing the gear position which the transmission assumes. When thereafter the shift lever 6 is released, the same is pivoted forward due to the force of the biasing means 4a. With this, the position lever 8 is forced to abut against one of the steps of the position plate 10 keeping the gear position which the transmission has assumed.

According to the present invention, the following measure is further employed, which embodies the safety device of the column shift.

As is seen from FIG. 1, the safety device 100 is positioned near the position plate 10. The safety device 100 comprises a pivotal lock lever 102 which is capable of locking the position plate 8 under a certain condition. The lock lever 102 has a generally L-shaped cross section including first and second wing portions 102a and 102b which are right-angled.

The lock lever 102 is pivotally connected at a junction portion of the two wing portions 102a and 102b to a suitable fixed member (not shown) through a pivot pin 106. The first wing portion 102a is formed with a slot 104 which is sized to receive a free end of the position lever 8. That is, when the position lever 8 assumes the Parking-position abutting against the corresponding step of the position plate 10, a counterclockwise movement of the lock lever 102 in FIG. 1 brings about insertion of the free end of the position lever 8 into the slot 104 of the first wing portion 102a of the lock lever 102.

For actuating the lock lever 102, there is employed an electric actuator 108 which has a plunger 108a pivotally connected to the second wing portion 102b of the lock lever 102. That is, when the actuator 108 is energized, the plunger 108 is pulled by the actuator 108 thereby to pivot the lock lever 102 to a lock position as illustrated by a solid line. While, when the actuator 108 is deenergized, the plunger 108 is drawn from the actuator 108 thereby to pivot the lock lever 102 to an unlock position as illustrated by a broken line.

Figure 4:
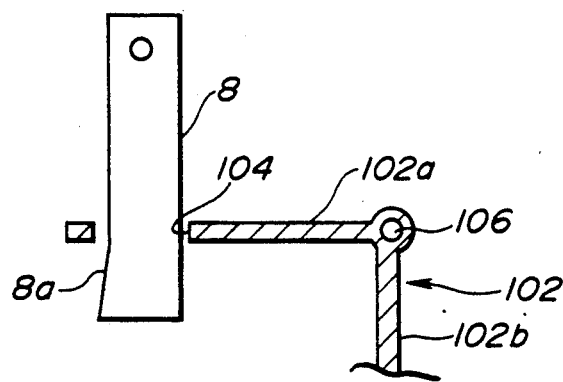
FIG. 4 is a view showing a position lever and a lock lever which are parts of the safety device.

As is seen from FIG. 4, preferably, the free end of the position lever 8 has at a front side a sloped surface 8a in order to assure a locked condition of the position plate 8 relative to the lock lever 102.

As is shown in FIG. 2, a foot brake switch 110 is connected to the electric actuator 108, which is arranged to energize the electric actuator 108 when the foot brake 112 is left undepressed, but deenergize the electric actuator 108 when the foot brake 110 is depressed.

In the following, operation will be described.

Under the Parking condition of the transmission, the position lever 8 is kept abutting against the corresponding step of the position plate 10 and locked by the lock lever 102, as is illustrated by the solid line in FIG. 1. Thus, under this condition, the shift lever 6 can not be moved.

When the foot brake 112 is depressed by the driver, the electric actuator 108 is deenergized. With this, the lock lever 102 is pivoted to assume the unlock position as shown in the braken line. Thus, thereafter, the shift lever 6 is permitted to move normally.

As will be understood from the foregoing description, in the column shift according to the present invention, the shifting movement of the shift lever 6 from the Parking-position to the other positions is permitted only when the foot brake 112 is kept depressed. Thus, the safety of starting of the motor vehicle is assured in the present invention.

What is claimed is:

1. A column shift for use with a motor vehicle having an automatic transmission, comprising:
   an elongate hollow member supported by a fixed member of the motor vehicle, said hollow member being rotatable about a longitudinal axis thereof;
   link means for linking said hollow member to a hydraulically operated controller of the transmission;
   a control rod axially movably received in said elongate hollow member;
   a shift lever having one end articulated with one end of said control rod, said shift lever being pivotally connected to said elongate hollow member;
   a position lever pivotally connected to the other end of said control rod, said position lever having one end pivotally connected to said hollow member;
   a position plate secured to a fixed member of said motor vehicle and having a stepped edge to which a free end portion of said position lever being engageable;
   a lock lever movable between a first position wherein said lock lever locks said position lever when the latter assumes a given position of said stepped edge and a second position wherein the lock lever unlocks said position lever; and
   an electric actuator for moving said lock lever between said first and second positions.

2. A column shift as claimed in claim 1, further comprising a foot brake switch which is arranged to energize said electric actuator to bring out the first position of said lock lever when a foot brake of the motor vehicle is kept undepressed, and deenergize said electric actuator to bring out the second position of said lock lever when said foot brake is depressed.

3. A column shift as claimed in claim 2, in which said lock lever is a pivotal member which is pivotal between said first and second positions and comprises first and second wing portions which are right-angled, said first wing portion being formed with a slot which receives a free end of said position lever when said lock lever assumes said first position.

4. A column shift as claimed in claim 3, in which said electric actuator has a longitudinally movable plunger which has a free end pivotally connected to said second wing portion of said lock lever.

5. A column shift as claimed in claim 1, in which said given position of said stepped edge of said position plate corresponds to a Parking-position wherein said automatic transmission assumes the Parking-position.

6. A column shift as claimed in claim 1, further comprising biasing means by which said position lever is biased toward the stepped edge of said position plate.

* * * * *